(12) United States Patent
Kim et al.

(10) Patent No.: US 11,014,825 B2
(45) Date of Patent: May 25, 2021

(54) METHOD FOR PRODUCING POTASSIUM TITANATE

(71) Applicants: LG CHEM, LTD., Seoul (KR); CHANGWON NATIONAL UNIVERSITY INDUSTRY ACADEMY COOPERATION CORPS, Changwon-si (KR)

(72) Inventors: Jong Hun Kim, Daejeon (KR); Je Kyun Lee, Daejeon (KR); Dong Sik Bae, Changwon-si (KR); Yeon Bin Choi, Changwon-si (KR)

(73) Assignees: LG CHEM, LTD., Seoul (KR); CHANGWON NATIONAL UNIVERSITY INDUSTRY ACADEMY COOPERATIONS CORPS, Gyeongsangnam-Do (KR)

( * ) Notice: Subject to any disclaimer, the term of this patent is extended or adjusted under 35 U.S.C. 154(b) by 82 days.

(21) Appl. No.: 16/335,215

(22) PCT Filed: Oct. 25, 2017

(86) PCT No.: PCT/KR2017/011868
§ 371 (c)(1),
(2) Date: Mar. 20, 2019

(87) PCT Pub. No.: WO2018/221794
PCT Pub. Date: Dec. 6, 2018

(65) Prior Publication Data
US 2019/0248671 A1    Aug. 15, 2019

(30) Foreign Application Priority Data
May 30, 2017    (KR) ........................ 10-2017-0066607

(51) Int. Cl.
*C01G 23/00*    (2006.01)

(52) U.S. Cl.
CPC ........ *C01G 23/005* (2013.01); *C01P 2002/30* (2013.01); *C01P 2002/72* (2013.01);
(Continued)

(58) Field of Classification Search
CPC .................................................... C01G 23/005
See application file for complete search history.

(56) References Cited

U.S. PATENT DOCUMENTS

| 3,331,658 A | 7/1967 | Lewis et al. |
| 2017/0044023 A1 | 2/2017 | Nakashima et al. |
| 2017/0291855 A1 | 10/2017 | Kamada |

FOREIGN PATENT DOCUMENTS

| CN | 1740408 A | 3/2006 |
| CN | 106629827 A | 5/2017 |

(Continued)

OTHER PUBLICATIONS

Ju Wang et al., "Synthesis of Potassium Hexatitanate Whiskers Using Hydrothermal Method", Rare Metals, vol. 28, No. 1, Feb 2009, pp. 24-32.

(Continued)

*Primary Examiner* — James A Fiorito
(74) *Attorney, Agent, or Firm* — Dentons US LLP

(57) ABSTRACT

The present invention relates to a method for producing potassium titanate, and the present invention provides a method for producing potassium titanate which uses anatase-phased titanium dioxide to simplify the process by a hydrothermal method, and thus may improve economical efficiency and productivity, and in which the reaction temperature, the reaction time and the molar ratio of a precursor may be controlled to produce a high-purity potassium titanate whisker having a nano size of an uniform shape.

12 Claims, 13 Drawing Sheets

(52) U.S. Cl.
    CPC ...... *C01P 2004/03* (2013.01); *C01P 2004/17* (2013.01); *C01P 2004/54* (2013.01); *C01P 2004/62* (2013.01); *C01P 2006/32* (2013.01)

(56) References Cited

FOREIGN PATENT DOCUMENTS

| CN | 106637408 A | 5/2017 |
|---|---|---|
| KR | 10-0096678 B1 | 11/1995 |
| KR | 10-1150075 B1 | 6/2012 |
| KR | 10-2016-0146683 A | 12/2016 |
| KR | 10-1727503 B1 | 4/2017 |
| KR | 10-2017-0058986 A | 5/2017 |

OTHER PUBLICATIONS

Yumin Qi et al., "Highly active K2Ti6O13 nanowires: Synthesis, characterization and photocatalytic activity", Advanced Materials Research, vol. 662, Dec. 31, 2013, pp. 20-23.

METHOD FOR PRODUCING POTASSIUM TITANATE

This application is a National Stage Application of International Application No. PCT/KR2017/011868, filed on Oct. 25, 2017, and claims the benefit of Korean Patent Application No. 10-2017-0066607, filed on May 30, 2017, in the Korean Intellectual Property Office, the disclosure of which is incorporated herein in its entirety by reference.

TECHNICAL FIELD

The present invention relates to a method for producing potassium titanate, which uses anatase-phased titanium dioxide as a titanium precursor and synthesizes potassium titanate by a hydrothermal method.

BACKGROUND

A potassium titanate whisker not only has excellent mechanical performance, but also has very unique physico-chemical properties particularly due to its own tunnel structure. As examples of such properties, there are high infrared reflectance, low thermal conductivity, high heat resistance, high abrasion resistance, high electrical insulation, low dielectric constant, chemical stability, and the like.

A $K_2Ti_6O_{13}$ whisker is excellent in performance and has a much lower cost than other whiskers. Therefore, $K_2Ti_6O_{13}$ whiskers are widely applied and thus attracts much attention especially from the automobile industry. A friction material made of the $K_2Ti_6O_{13}$ whiskers is used as a brake pad for luxury passenger cars and small passenger cars. In addition, $K_2Ti_6O_{13}$ whisker also have applications as a heat retention material, a thermal insulation material, and a building material. Thus, the demand therefor is expected to be more than several thousand tons. In addition, a whisker-reinforced thermoplastic and thermosetting plastic composite material is being used as a material ideal and important for automobiles and other precision instruments and equipment, and is also applied for development of paints, military applications, chemicals, paper-making, and the like, due to various functional characteristics of the whiskers.

The $K_2Ti_6O_{13}$ whisker is produced by methods such as a solid state method, a hydrothermal method, a calcination method, a flux method, a slow-cooling method, a melting method, a kneading-drying-calcination (KDC) method, and a sol-gel method. Although the $K_2Ti_6O_{13}$ whisker is one of the several whiskers which have been successful to some extent in commercial applications, high production costs constrain mass production and wider adoption of the use of the $K_2Ti_6O_{13}$ whisker. Therefore, reduction of production costs is essential.

PRIOR ART LITERATURE (Patent Document 1) Korean Patent Registration Publication No. 10-1150075 (published on May 18, 2012)

SUMMARY

For solving the above problems, the present invention provides a method for producing potassium titanate capable of producing a uniform-shaped, nano-sized, high-purity potassium titanate whisker, which uses an anatase-phased titanium dioxide as a titanium precursor to simplify the process by a hydrothermal method and thus may improve economical efficiency and productivity, and control reaction temperature, reaction time, and molar ratio of precursors.

DETAILED DESCRIPTION

Technical Problem

An aspect of the present invention provides a method for producing potassium titanate, which in order to simplify the process and improve economical efficiency and productivity thereof, may use anatase-phased titanium dioxide as a titanium precursor to synthesize potassium titanate by the hydrothermal method.

Another aspect of the present invention provides a method for producing potassium titanate, which may synthesize a uniform shaped, nano sized, high-purity potassium titanate by controlling process variables such as a reaction temperature, a reaction time, and a molar ratio of precursors.

Technical Solution

According to an aspect of the present invention, there is provided a method for producing potassium titanate including: 1) preparing a mixed solution including a titanium precursor and a potassium precursor; and 2) heat-treating the mixed solution to synthesize potassium titanate, wherein the titanium precursor is anatase-phased titanium dioxide (a-$TiO_2$), the heat treatment temperature is 200 to 300° C., and the heat treatment time is 3 hours or more.

Advantageous Effects

According to a method for producing potassium titanate of the present invention, the use of the hydrothermal method enables the reaction rate to increase even under a low temperature condition, the exclusion of a milling step of the precursor enables expected cost savings, and the use of the anatase-phased titanium dioxide with low cost and excellent reactivity as a titanium precursor may achieve additional cost savings, and the reaction time and the reaction temperature may be significantly reduced to simplify the process and improve economical efficiency and productivity.

In addition, the present invention achieves an effect of synthesizing a uniform-shaped, nano-sized, high-purity potassium titanate by controlling process variables such as a reaction temperature, a reaction time, and a molar ratio of precursors.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A potassium titanate whisker is a material having a fibrous shape, wherein among various types of potassium titanates, a potassium 6-titanate ($K_2Ti_6O_{13}$) is excellent in insulation property, chemical resistance, and heat resistance. The potassium titanate whisker is a high-strength, high-stiffness material of the same caliber as carbon fiber, and has excellent abrasion resistance with a hardness equivalent to alumina. Therefore, the potassium titanate whisker is applied to insulators, reinforced composite materials, metal reinforcements, thermal insulation materials, friction materials and the like, and recently, research on photocatalytic materials made from potassium titanate whisker has been also been conducted.

Examples of methods for synthesizing potassium titanate include a solid state method, a hydrothermal method, a calcination method, a flux method, a slow-cooling method, a melting method, a kneading-drying-calcination (KDC) method, and a sol-gel method.

Figure 1:
FIG. 1 is a flowchart illustrating a method for producing potassium titanate by a conventional solid state method.

Meanwhile, as illustrated in FIG. 1, in the conventional solid state method, potassium titanate fibers were produced by mixing a certain ratio of a potassium precursor and a titanium precursor with a strong energy by using ball milling equipment and then heat-treating the mixture for a long time at a high temperature of 1100° C. or higher. When the calcination was performed at a heat treatment temperature of 1000° C. or less, or the calcination time was short, the resulting potassium titanate came in the form of a granular type rather than a fiber type, and thus the solid state method inevitably required heat treatment at a high temperature for a long time. Therefore, the above method of performing heat treatment at a high temperature for a long time caused a disadvantage that a large amount of energy was consumed thus raising production costs and requiring excessive operation of the production facilities.

Accordingly, for the mass production of the potassium titanate whisker, the present invention solves various technical problems and thus provides a method for producing a nano-sized potassium titanate whisker in an economical way through cost reduction.

Figure 2:
FIG. 2 is a flowchart illustrating a method for producing potassium titanate by a hydrothermal method of the present invention.

Hereinafter, a method for producing potassium titanate according to an embodiment of the present invention will be described in detail for each step with reference to the flowchart illustrated in FIG. 2.

Step 1)

Step 1) according to an embodiment of the present invention is characterized by preparing a mixed solution including a titanium precursor and a potassium precursor.

The present invention is characterized by producing potassium titanate by using the hydrothermal method for producing a high-purity nano-sized potassium titanate excellent in economical efficiency and productivity.

Specifically, the hydrothermal method of the present invention is a method for synthesizing potassium titanate by using the nucleation of precursors and the growth of crystals under supercritical conditions, wherein the reaction rate is fast at a low temperature, the dispersibility of particles is good, and particle diameter, shape, particle size distribution and purity are easy to control, and thus potassium titanate having a uniform shape and a nanometer scale size may be produced.

In addition, according to the hydrothermal method of the present invention, a ball milling process for mixing precursor particles is not required. Thus, in comparison with the conventional solid state methods, the potassium titanate may be produced in a shorter period of time without a separate ball milling facility, and thus the hydrothermal method may simplify the process and reduce production costs. Therefore, the hydrothermal method is effective for economical efficiency and productivity.

Meanwhile, the method for producing potassium titanate of the present invention is characterized by using anatase-phased titanium dioxide (a-$TiO_2$) as a titanium precursor.

The titanium dioxide is present as a rutile phase or an anatase phase depending on a transition temperature. In the present invention, the anatase-phased titanium dioxide (a-$TiO_2$) is preferably used. In general, the hydrothermal method uses a relatively expensive titanium chloride ($TiCl_4$) as a titanium precursor. However, the method for producing potassium titanate of the present invention uses anatase-phased titanium dioxide (a-$TiO_2$) which is relatively cheap and easily obtained in comparison with titanium chloride (TiCl$_4$), thereby being capable of achieving additional cost reduction.

In addition, anatase-phased titanium dioxide has a relatively high solubility at a low temperature and is excellent in reactivity with K$^+$ ions. Thus, potassium titanate may be synthesized without going through intermediates, unlike titanium chloride, and the crystallization reaction time for synthesizing potassium titanate may also be largely reduced from 24 hours to about 5 hours or less, more specifically, to 4 hours or less.

Anatase-phased titanium dioxide may include titanium metal and titanium hydride, but the purity thereof is preferably 90% or more.

In addition, the potassium precursor according to an embodiment of the present invention may use at least one selected from the group consisting of potassium oxide, potassium carbonate, potassium hydroxide, and potassium oxalate. More specifically, it is preferable to use potassium hydroxide, which has high reactivity during the crystallization reaction with the titanium precursor, and hardly retains impurities.

The present invention produces potassium titanate by the hydrothermal method, wherein the titanium precursor and the potassium precursor are mixed with an organic solvent such as distilled water, hexane or ethanol, more specifically distilled water, to produce a mixed solution, and then a crystallization reaction is performed.

Specifically, the mixed solution is characterized by including at least one selected from the group consisting of distilled water, hexane, alcohol having 2 to 8 carbon atoms such as ethanol, and acetone. In order to synthesize a uniform-shaped potassium titanate, distilled water is most preferable.

On the other hand, the method for producing potassium titanate according to an embodiment of the present invention is characterized by controlling a molar ratio of precursors in a specific range in order to synthesize a high purity potassium titanate having a uniform shape and a nano size.

When potassium titanate is potassium 6-titanate (K$_2$Ti$_6$O$_{13}$), it is theoretically effective to provide the titanium precursor and the potassium precursor to the mixing process in an amount such that the number of moles of titanium atoms to the number of moles of potassium atoms becomes 6:2, but it is more preferable to add the amount of the potassium precursor in an excessive amount of 500 times or more than the amount of the titanium precursor in order to improve reactivity between the titanium precursor (a-TiO$_2$) and the potassium precursor (KOH).

More specifically, the method for producing potassium titanate of the present invention is characterized in that the titanium precursor and the potassium precursor are mixed at a molar ratio of 1:500 to 1:600. When the titanium precursor and the potassium precursor are not used at molar ratios in the above range, particularly when the potassium precursor is not sufficiently supplied, there may be a problem that the titanium precursor remains as rutile-phased TiO$_2$ rather than forming K$_2$Ti$_6$O$_{13}$. When the potassium precursor is excessively supplied, potassium ions act as impurities and interfere with the formation of the crystal phase, so that there may be a problem that whisker-shaped potassium titanate is not properly formed.

Step 2)

Step 2) according to an embodiment of the present invention is characterized by a crystallization reaction, wherein the mixed solution including the titanium precursor and the potassium precursor is heat-treated to synthesize the potassium titanate.

The method for producing potassium titanate of the present invention is characterized in that the hydrothermal method is used and nucleation and crystal growth are carried out under supercritical conditions to synthesize potassium titanate fibers. Specifically, the method of the present invention maintains supercritical water in a supercritical state, wherein the supercritical water has a low dielectric constant and thus has a low solubility with respect to ionic inorganic salts, which means that the rate of reaching the supersaturated state is very fast in the supercritical water.

Therefore, the present invention is characterized in that the reaction rate is fast even at a relatively low temperature. As a result, the method of the present invention may synthesize the potassium titanate fibers at a relatively low temperature in comparison with the conventional production methods in which a temperature of 1000° C. or more has been necessarily required, so that there is an effect that the process may be simple and the production cost of potassium titanate may be reduced.

Specifically, the potassium titanate of the present invention is characterized in that the crystallization reaction is performed at a temperature of 200 to 300° C., more specifically 210 to 240° C., to synthesize the potassium titanate. When the crystallization reaction is performed at a temperature lower than 210° C., an unreacted titanium precursor may be mixed in an excessive amount, and the potassium titanate may be synthesized in an unevenly agglomerated state not having a constant aspect ratio. When the crystallization reaction is carried out at a temperature higher than 240° C., the effect of reduction in production costs according to the low temperature process may be reduced.

In addition, the method for producing potassium titanate of the present invention is characterized in that the anatase-phased titanium dioxide excellent in reactivity with the potassium precursor is used as the titanium precursor, so that the time taken for the crystallization reaction of synthesizing the potassium titanate is largely reduced from conventional 24 hours to 3 to 5 hours or less. In this case, in order to synthesize potassium titanate having a uniform shape and size, it is more preferable to maintain a constant pressure until the completion of the crystallization reaction.

In addition, the production method is characterized in that the steps of washing and drying the synthesized potassium titanate are further included. Specifically, the synthesized potassium titanate may be washed 5 times by using distilled water after the completion of the crystallization reaction to thus remove unreacted precursors, impurities or solvents. Thereafter, a heat treatment may be carried out in a dryer at 100° C. for 2 hours to obtain a high-purity potassium titanate.

Potassium titanate is present in various forms, and may be represented by a general formula of K$_2$O·nTiO$_2$ (n is an integer of 1 to 12). When n=2, K$_2$O·nTiO$_2$ is potassium dititanate (K$_2$Ti$_2$O$_5$), when n=4, K$_2$O·nTiO$_2$ is potassium tetratitanate (K$_2$Ti$_4$O$_9$), when n=6, K$_2$O·nTiO$_2$ is potassium hexatitanate (K$_2$Ti$_6$O$_{13}$), and when n=8, K$_2$O·nTiO$_2$ is potassium octatitanate (K$_2$Ti$_8$O$_{17}$). When n=2, 4, K$^+$ ions are easily substituted in TiO$_2$ crystals and are used as ion exchange materials, and when n=6, 8, K$_2$O·nTiO$_2$ has a form in which K$^+$ ions are trapped in TiO$_2$ crystals and which is physicochemically stable, and thus is widely used industrially.

Figure 15:
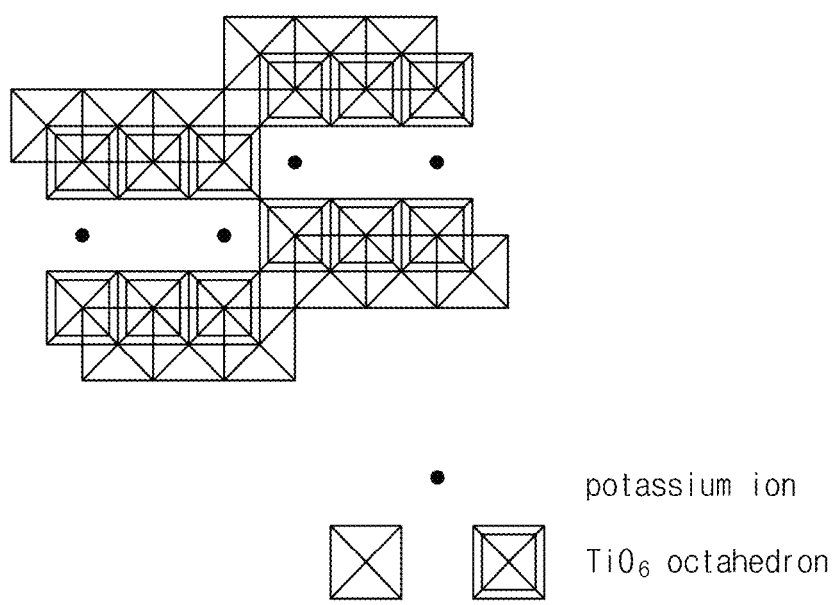
FIG. 15 is a schematic diagram illustrating a crystal structure of $K_2Ti_6O_{13}$ produced by an embodiment of the present invention.

The potassium titanate produced by the production method of the present invention is characterized as being a potassium 6-titanate ($K_2Ti_6O_{13}$) having the crystal structure illustrated in FIG. 15, from among the various types of the potassium titanate.

In addition, in the method for producing potassium titanate of the present invention, the hydrothermal method is used to synthesize the potassium titanate by utilizing nucleation and crystal growth under supercritical conditions, and thus the present invention maintains supercritical water in a supercritical state, wherein the supercritical water has a low dielectric constant and thus a low solubility with respect to ionic inorganic salts, which means that the rate of reaching a supersaturated state is very fast, the critical size of the nucleated particle is a very small, and the reaction material is not further supplied around the produced particles, so that uniform nano particles are easily formed. As a result, the size of resulting $KTiO_3$ phase, which becomes a monomer of $K_2Ti_6O_{13}$, is very small due to the reaction between $TiO_3^-$ and $K^+$ ions, and finally, when the reaction is completed with $K_2Ti_6O_{13}$ phase, nano-sized whiskers are synthesized.

Therefore, the potassium titanate produced by the production method of the present invention is characterized by being in a shape of whisker having a specific aspect ratio and in that the length thereof is 100 to 600 nm on average and have a uniform size.

In addition, the method for producing potassium titanate of the present invention is characterized in that precursors are added at a specific molar ratio in the range of a specific temperature to perform the crystallization reaction, thereby properly controlling the growth of the length (long diameter) direction while suppressing the growth of the diameter (short diameter) direction to obtain an average aspect ratio (an average of length (long diameter)/diameter (short diameter)) of 10:1 to 15:1. The diameter and length may be calculated by using a linear intercept method.

As described above, the method for production potassium of the present invention is characterized in that anatase-phased titanium dioxide is used as a titanium precursor to synthesize potassium titanate by the hydrothermal method. Further, process variables such as reaction temperature, reaction time, and molar ratio of precursors are adjusted, thereby achieving process simplification and excellent economical efficiency and productivity, and a high purity potassium titanate whisker having nanometer range sizes and micrometer range sizes may be synthesized, so that the present method is expected to be widely used in related industries.

Hereinafter, examples of the present invention will be described in detail so that those skilled in the art can easily carry out the present invention. The present invention may, however, be embodied in many different forms and should not be construed as limited to the examples set forth herein.

EXAMPLE 1

1) Anatase-phased $TiO_2$ (Titanium (IV) Oxide, Anatase, 99.8%, SIGMA-ALDRICH) and potassium hydroxide (KOH, 85%, DEAJUNG) were mixed and stirred in distilled water (D.I water) at a molar ratio of 1:600, 2) heat-treated for 4 hours at 240° C., and 3) washed and dried to produce a potassium titanate whisker.

EXAMPLE 2

1) Anatase-phased $TiO_2$ and KOH were mixed and stirred in distilled water (D.I water) at a molar ratio of 1:600, 2) heat-treated for 4 hours at 210° C., and 3) washed and dried to produce a potassium titanate whisker.

EXAMPLE 3

1) Anatase-phased $TiO_2$ and KOH were mixed and stirred in distilled water (D.I water) at a molar ratio of 1:600, 2) heat-treated for 3 hours at 210° C., and 3) washed and dried to produce a potassium titanate whisker.

EXAMPLE 4

1) Anatase-phased $TiO_2$ and KOH were mixed and stirred in distilled water (D.I water) at a molar ratio of 1:500, 2) heat-treated for 4 hours at 210° C., and 3) washed and dried to produce a potassium titanate whisker.

EXAMPLE 5

1) Anatase-phased $TiO_2$ and KOH were mixed and stirred in distilled water (D.I water) at a molar ratio of 1:400, 2) heat-treated for 4 hours at 210° C., and 3) washed and dried to produce a potassium titanate whisker.

COMPARATIVE EXAMPLE 1

1) Anatase-phased $TiO_2$ was mixed with potassium carbonate ($K_2CO_3$, 98%, SIGMAALDRICH) and potassium nitrate ($KNO_3$, 96+%, SIGMAALDRICH) at a molar ratio of 1:600 and then ball milled for 6 hours, 2) heat-treated for 4 hours at 1150° C., and 3) washed and dried to produce a potassium titanate whisker.

COMPARATIVE EXAMPLE 2

1) $TiCl_4$ and KOH were mixed and stirred in distilled water at a molar ratio of 1:600, 2) heat-treated for 24 hours at 240° C., and 3) washed and dried to produce a potassium titanate whisker.

COMPARATIVE EXAMPLE 3

1) Anatase-phased $TiO_2$ and KOH were mixed and stirred in distilled water at a molar ratio of 1:600, 2) heat-treated for 4 hours at 150° C., and 3) washed and dried to produce a potassium titanate whisker.

COMPARATIVE EXAMPLE 4

1) Anatase-phased $TiO_2$ and KOH were mixed and stirred in distilled water at a molar ratio of 1:600, 2) heat-treated for 4 hours at 180° C., and 3) washed and dried to produce a potassium titanate whisker.

Comparative Example 5

1) Anatase-phased $TiO_2$ and KOH were mixed and stirred in distilled water at a molar ratio of 1:600, 2) heat-treated for 1 hours at 210° C., and 3) washed and dried to produce a potassium titanate whisker.

COMPARATIVE EXAMPLE 6

1) Anatase-phased $TiO_2$ and KOH were mixed and stirred in distilled water at a molar ratio of 1:600, 2) heat-treated for 2 hours at 210° C., and 3) washed and dried to produce a potassium titanate whisker.

EXPERIMENTAL EXAMPLE 1

FE-SEM Photographing

In order to compare the shape and crystallinity of each potassium titanate produced in Examples 1 to 5 and Comparative Examples 1 to 6, a photograph was taken by using a field emission scanning electron microscope (FE-SEM) (MIRA II LMH). The results are shown in FIGS. 3, 4, 6, 7, 9, 11, and 13. A detailed description of each drawing will be given later.

EXPERIMENTAL EXAMPLE 2

XRD Diffraction Analysis

In order to confirm the crystal structure of each potassium titanate produced in Examples 1 to 5 and Comparative Examples 2 to 6, X-ray diffraction spectroscopy (XRD) was performed by using Model MiniFlux II (Rigaku Co., Tokyo, Japan). The results are shown in FIGS. 5, 8, 10, 12 and 14. A detailed description of each drawing will be given later.

EXPERIMENTAL EXAMPLE 3

Aspect Ratio Measurement

In order to confirm the uniformity of the potassium titanate crystals produced in Examples 1 to 5 and Comparative Examples 3 to 6, the aspect ratio of the potassium titanate crystals produced by controlling the reaction temperature, the reaction time and the molar ratio of the precursors was measured, and the results are shown in Tables 1 to 3 below.

TABLE 1

| Fixed Condition | Reaction Temperature | Aspect Ratio |
|---|---|---|
| Molar ratios of titanium precursor and potassium precursor: 1:600 Reaction time: 4 hours | 150° C. (Comparative Example 3) | 0.158 um/ 0.033 um = 4.79 |
| | 180° C. (Comparative Example 4) | 0.185 um/ 0.022 um = 8.41 |
| | 210° C. (Example 2) | 0.311 um/ 0.027 um = 11.52 |
| | 240° C. (Example 1) | 0.546 um/ 0.045 um = 12.13 |

TABLE 2

| Fixed Condition | Reaction Time | Aspect Ratio |
|---|---|---|
| Molar ratios of titanium precursor and potassium precursor: 1:600 Reaction temperature: 210° C. | 1 hour (Comparative Example 5) | — |
| | 2 hours (Comparative Example 6) | 0.122 um/ 0.017 um = 7.18 |
| | 3 hours (Example 3) | 0.323 um/ 0.028 um = 11.54 |
| | 4 hours (Example 4) | 0.311 um/ 0.027 um = 11.52 |

TABLE 3

| Fixed Condition | Molar ratios of titanium precursor and potassium precursor | Aspect Ratio |
|---|---|---|
| Reaction temperature: 210° C. Reaction Time: 4 hours | 1:400 (Example 5) | 0.294 um/ 0.026 um = 11.31 |
| | 1:500 (Example 4) | 0.465 um/ 0.041 um = 11.34 |
| | 1:600 (Example 2) | 0.311 um/ 0.027 um = 11.52 |

<Comparison of Shape of Potassium Titanate According to Synthetic Process>

Figure 4:
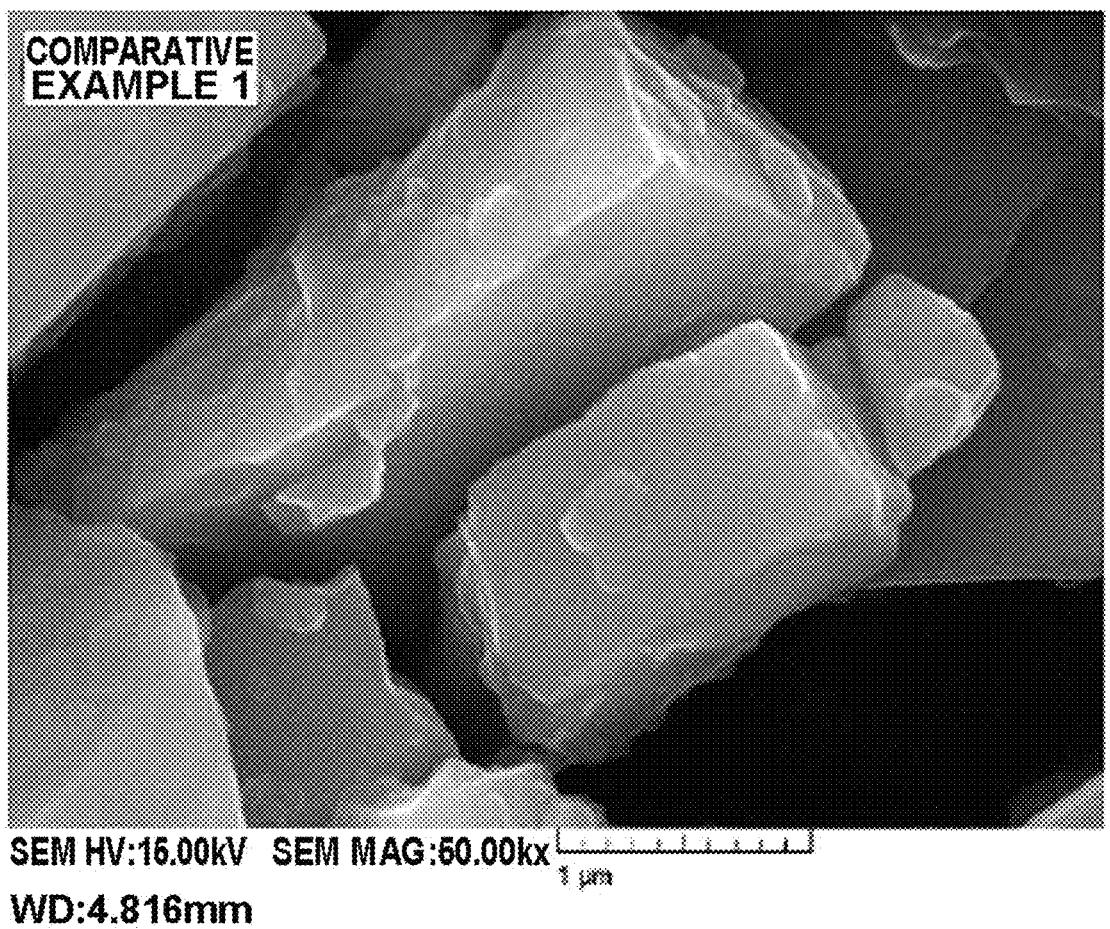
FIG. 4 is a FE-SEM photograph (scale bar: 1 μm) of the potassium titanate produced by Comparative Example 1 of the present invention.
Figure 5:
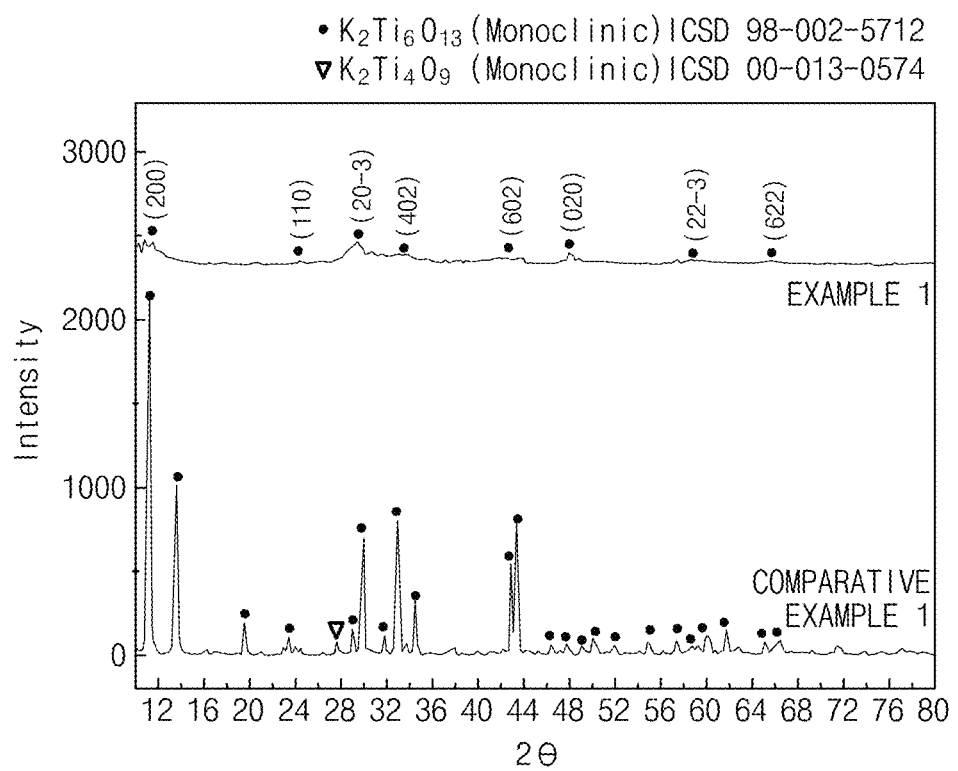
FIG. 5 is an X-ray diffraction analysis graph of the potassium titanate produced by Example 1 and Comparative Example 1 of the present invention.

Potassium titanate was produced by a hydrothermal method in Example 1 and a solid state method in Comparative Example 1. The FE-SEM photographs thereof are shown in FIGS. 3 and 4, and the XRD graph is shown in FIG. 5.

Figure 3:
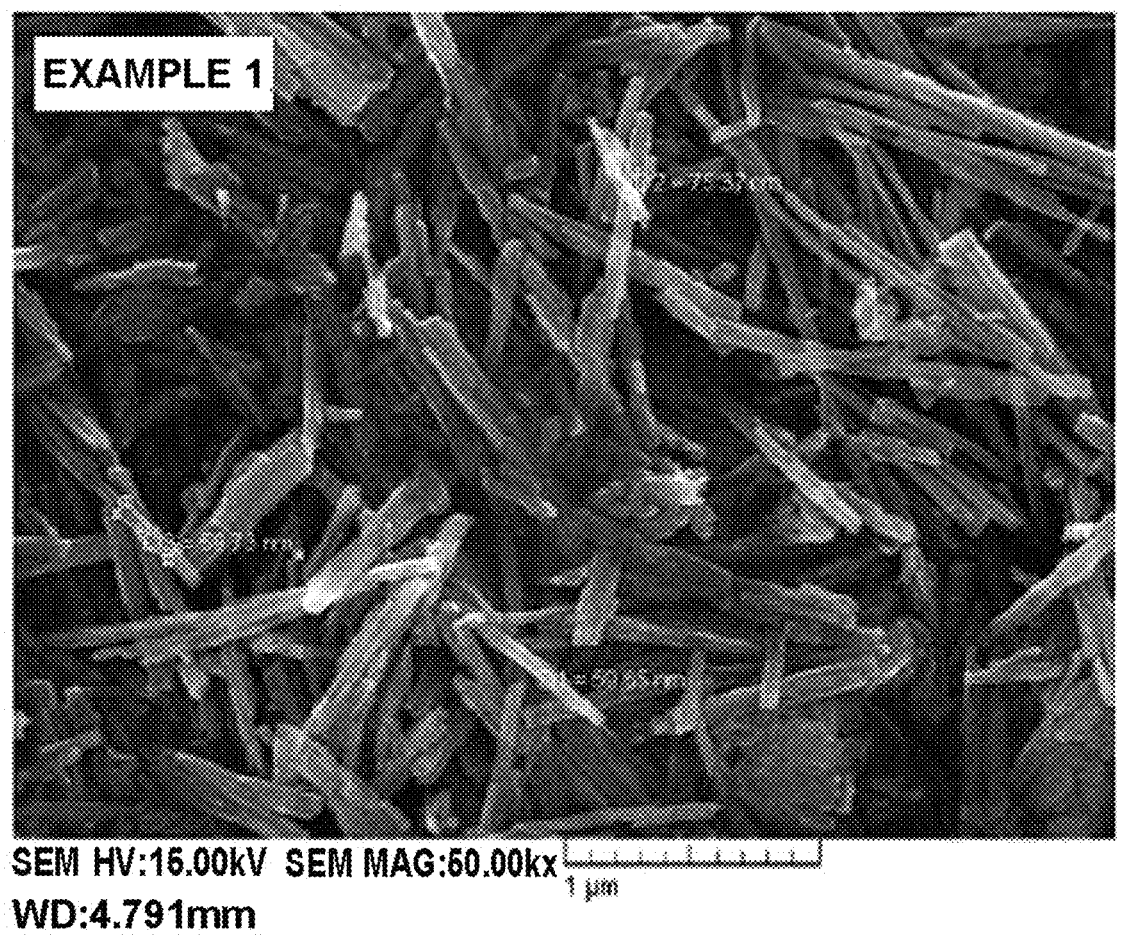
FIG. 3 is a FE-SEM photograph (scale bar: 1 μm) of the potassium titanate produced by Example 1 of the present invention.

As shown in FIG. 3, it was observed that the hydrothermal method of Example 1 produced uniform nano-sized potassium titanate whiskers even at a relatively low temperature of 240° C. According to the solid state method of Comparative Example 1, a ball milling step was essential, and potassium titanate whisker was produced by only reacting at a relatively high temperature of 1150° C. As shown in FIG. 4, it was observed that the size of the potassium titanate whisker was also micrometer sized. Further, as shown in FIG. 5, it was observed that $K_2Ti_4O_9$ potassium titanate in which a change in the $K_2Ti_6O_{13}$ crystal phase occurred, in the case of Comparative Example 1, was mixed in a small amount. This is because as the process temperature gradually decreases after the reaction, some crystal phase and shape are changed from $K_2Ti_6O_{13}$ to $K_2Ti_4O_9$ while passing through the temperature range (850-950° C.) at which the crystal phase is changed from the temperature range (above 1000° C.) at which $K_2Ti_6O_{13}$ is formed.

<Comparison of Shape and Crystallinity of Potassium Titanate according to Titanium Precursor>

Figure 7:
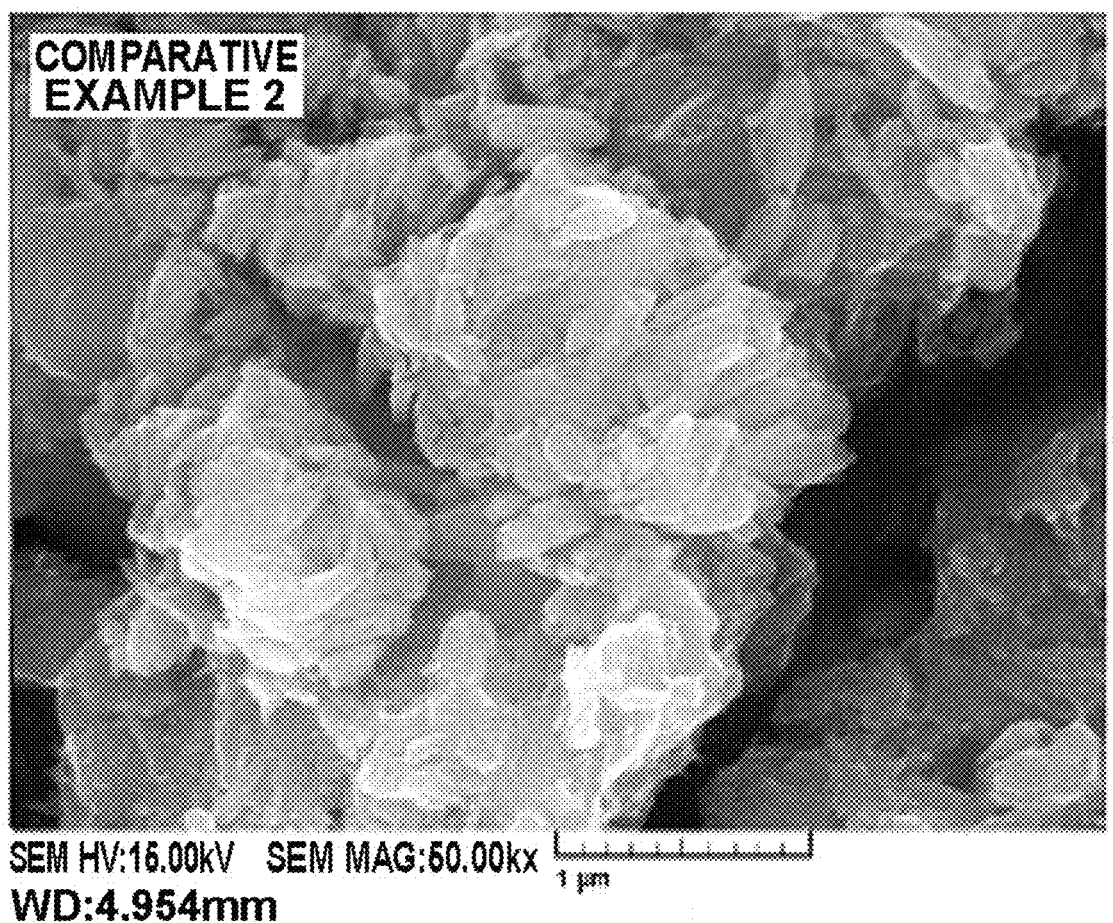
FIG. 7 is a FE-SEM photograph (scale bar: 1 μm) of the potassium titanate produced by Comparative Example 2 of the present invention.
Figure 8:
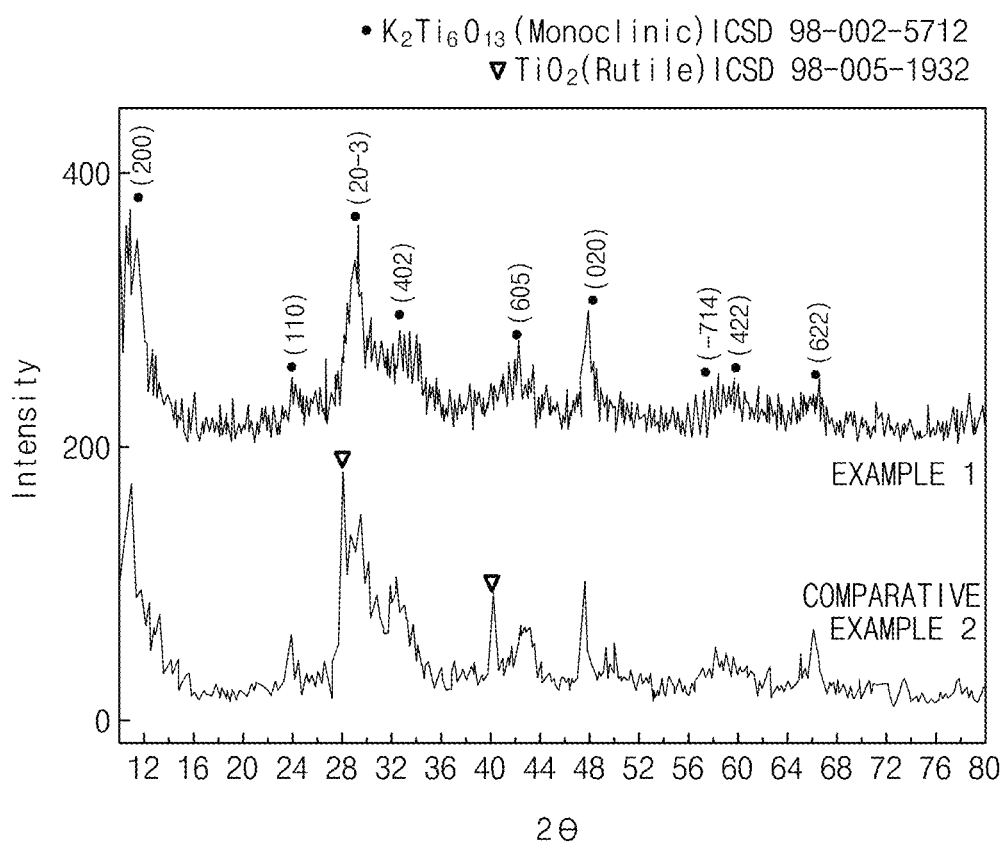
FIG. 8 is an X-ray diffraction analysis graph of the potassium titanate produced by Example 1 and Comparative Example 2 of the present invention.

Anatase-phased titanium dioxide was used as a titanium precursor in Example 1, and $TiCl_4$ was used in Comparative Example 2 to produce potassium titanate. The FE-SEM photographs thereof are shown in FIGS. 6 and 7, respectively, and the XRD graph is shown in FIG. 8.

Figure 6:
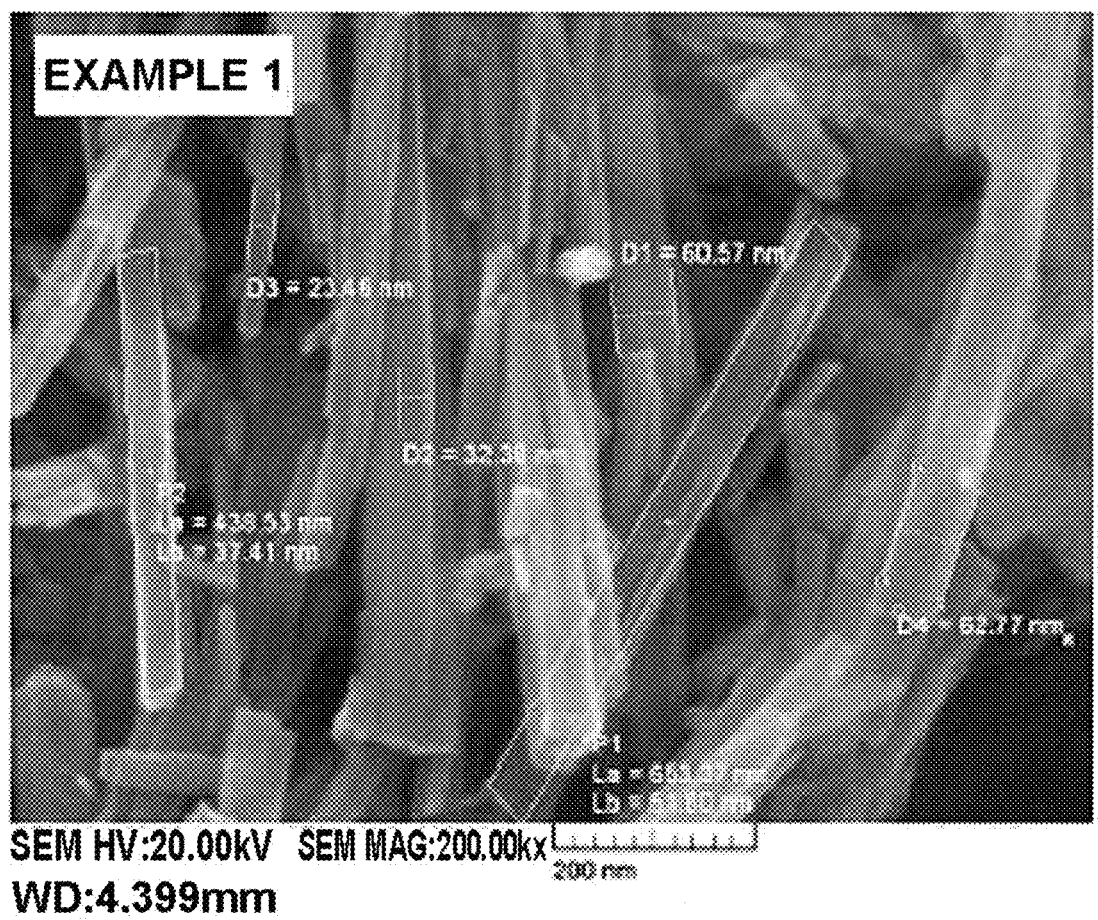
FIG. 6 is a FE-SEM photograph (scale bar: 200 nm) of the potassium titanate produced by Example 1 of the present invention.

As shown in FIG. 6, according to Example 1 using anatase-phased titanium dioxide as a titanium precursor, even when reacted for a relatively short time of 4 hours at a low temperature of 240° C., it was ascertained that a uniform shaped, nanometer-sized potassium titanate whisker was produced. On the contrary, as shown in FIG. 7, in the case of Comparative Example 2 using $TiCl_4$, it was ascertained that uneven form of potassium titanate was produced even during a very long reaction for 24 hours. As shown in FIG. 8, in the case of Comparative Example 2, the presence of $TiO_2$ in the unreacted phase indicated that the crystallization reaction was not completed.

<Comparison of Shape and Crystallinity of Potassium Titanate according to Reaction Temperature>

In Examples 1 and 2, the crystallization reaction was performed at 240° C. and 210° C., respectively. In Comparative Examples 3 and 4, the crystallization reaction was performed at 150° C. and 180° C. to produce potassium titanate, FE-SEM photographs are shown in FIG. 9, and XRD graphs are shown in FIG. 10.

Figure 9:
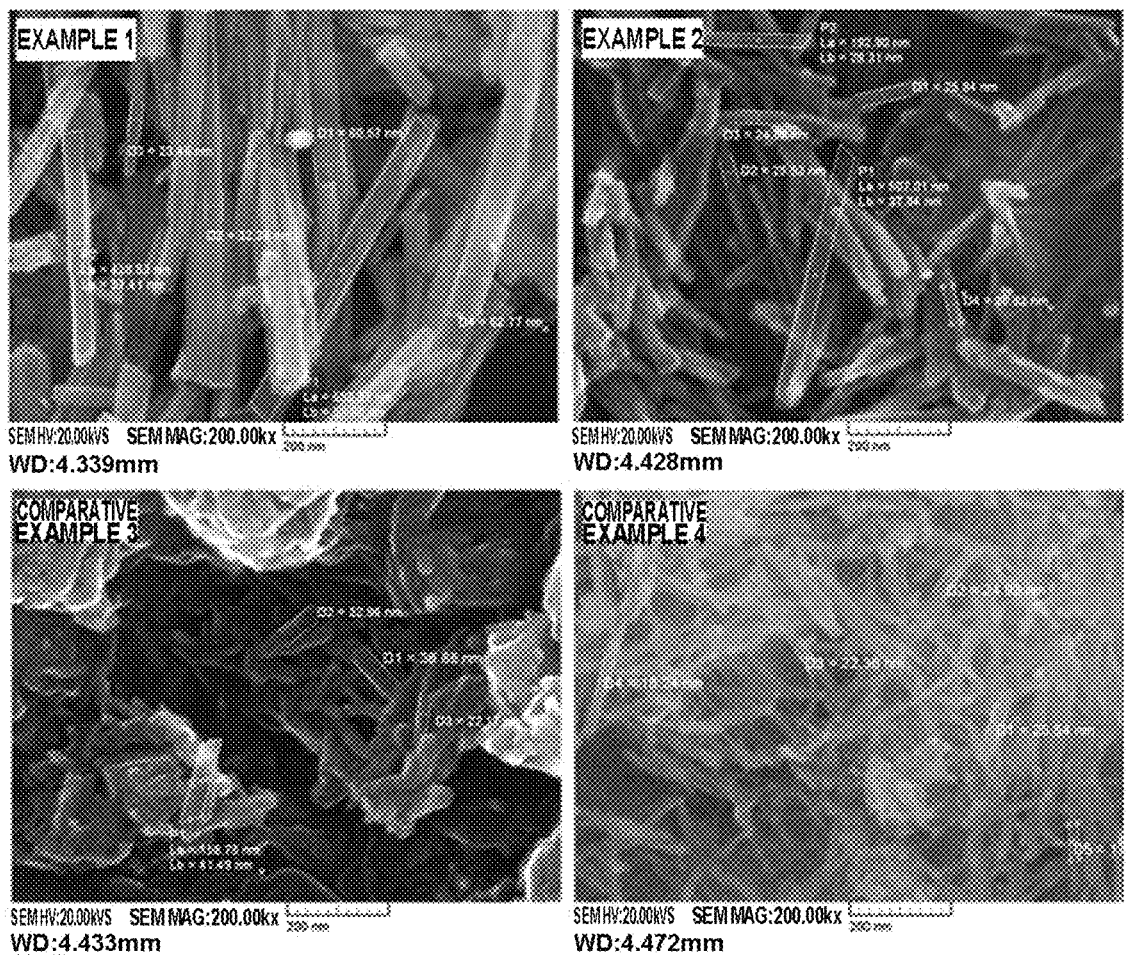
FIG. 9 is FE-SEM photographs (scale bar: 200 nm) of the potassium titanate produced by Examples 1 and 2 and Comparative Examples 3 and 4 of the present invention.
Figure 10:
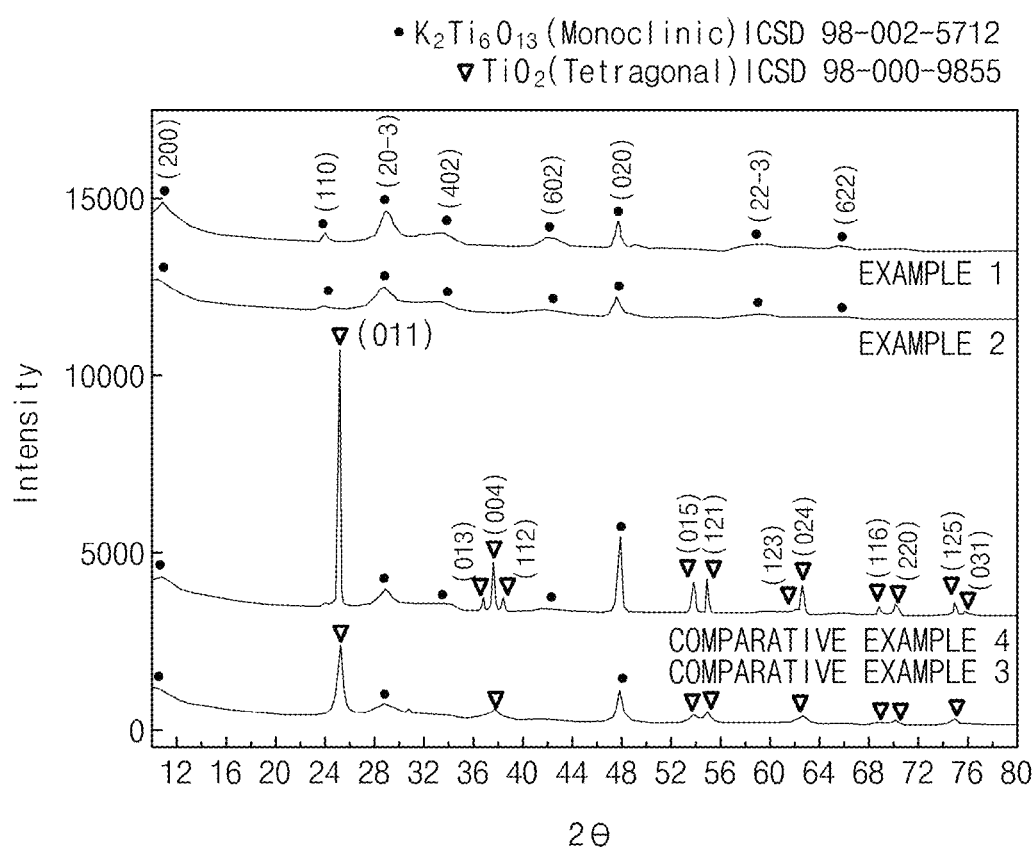
FIG. 10 is an X-ray diffraction analysis graph of the potassium titanate produced by Examples 1 and 2 and Comparative Examples 3 and 4 of the present invention.

As shown in FIG. 9, it was ascertained that in Examples 1 and 2, potassium titanate whiskers having uniform shapes and sizes were produced, while in Comparative Examples 3 and 4, potassium titanate whiskers having uneven shapes and sizes were produced. As shown in FIG. 10, in the case of Comparative Examples 3 and 4, the present of the unreacted $TiO_2$ indicated that the crystallization reaction was not completely performed.

Figure 16:
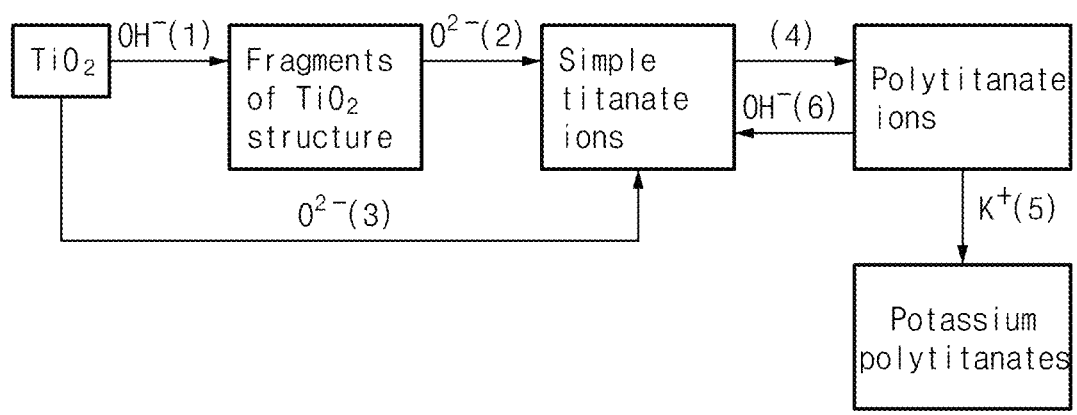
FIG. 16 is a flowchart illustrating a reaction in which potassium polytitanates are formed.

As described above, the reason why the $TiO_2$ phase remained at a temperature of 180° C. or less is considered that as shown in the flowchart of FIG. 16, oxygen ions ($O^{2-}$) bind to the $TiO_2$ particles pulverized by the hydroxyl group ($OH^-$) to generate titanate ions ($TiO_3^{2-}$), and polytitanate ions in which the generated titanate ions form layers with each other did not completely react with $K^+$ ions. When the temperature was more than 210° C., the $TiO_2$ phase did not remain, indicating that sufficient polytitanate ions were generated and saturated with $K^+$ ions (AV Gorokhovsky, J I E Garcia, T S Monjaras and C A G Chavarria, "Synthesis of potassium polytitanate precursors by treatment of $TiO_2$ with $KNO_3$ and KOH", J Eur Ceram Soc. 24 (2004) 3541).

<Comparison of Shape and Crystallinity of Potassium Titanate according to Reaction Time>

The crystallization was carried out at 210° C. for 4 hours and 3 hours in Examples 2 and 3, respectively, and the crystallization reaction was performed for 1 hour and 2 hours in Comparative Examples 5 and 6 to produce potassium titanate. The FE-SEM photographs thereof are shown in FIG. 11, and the XRD graph is shown in FIG. 12.

Figure 11:
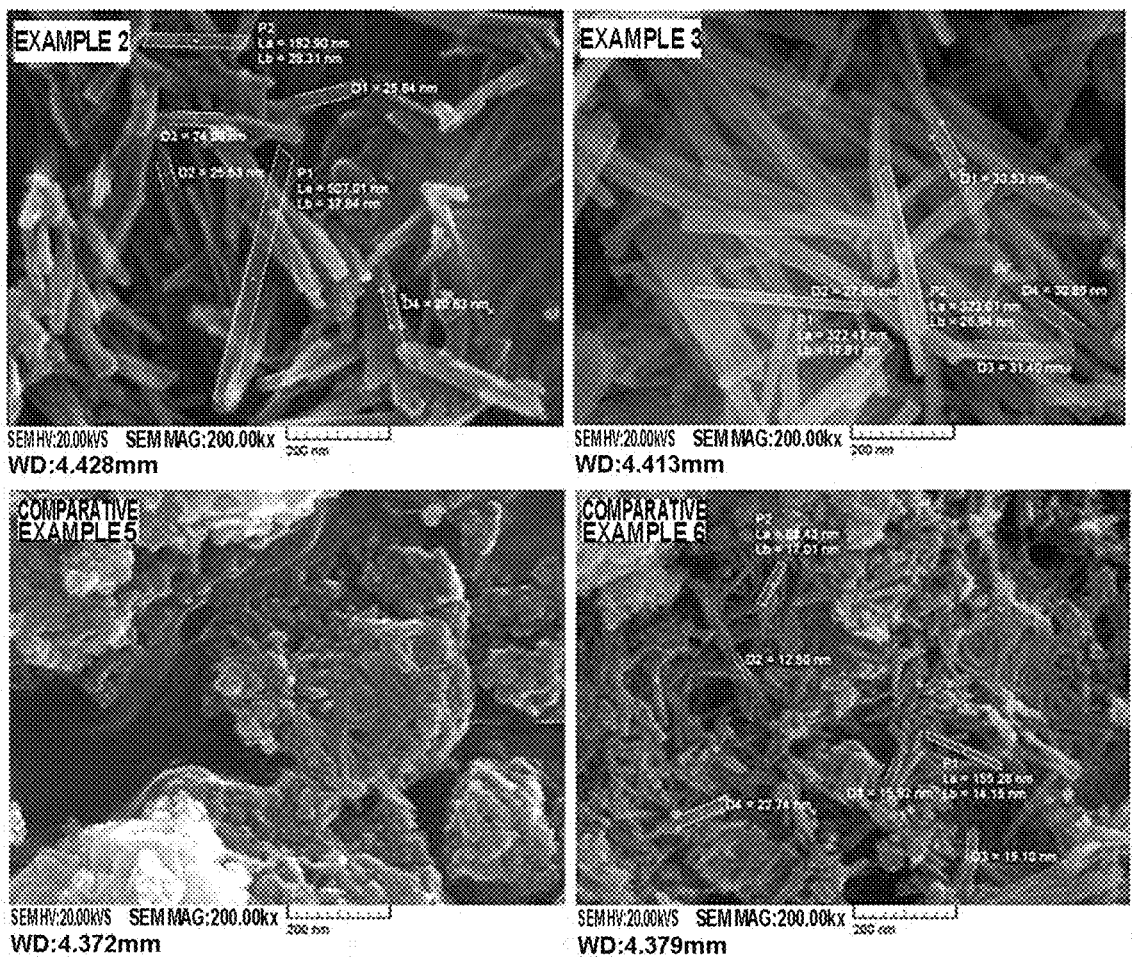
FIG. 11 is FE-SEM photographs (scale bar: 200 nm) of the potassium titanate produced by Examples 2 and 3 and Comparative Examples 5 and 6 of the present invention.
Figure 12:
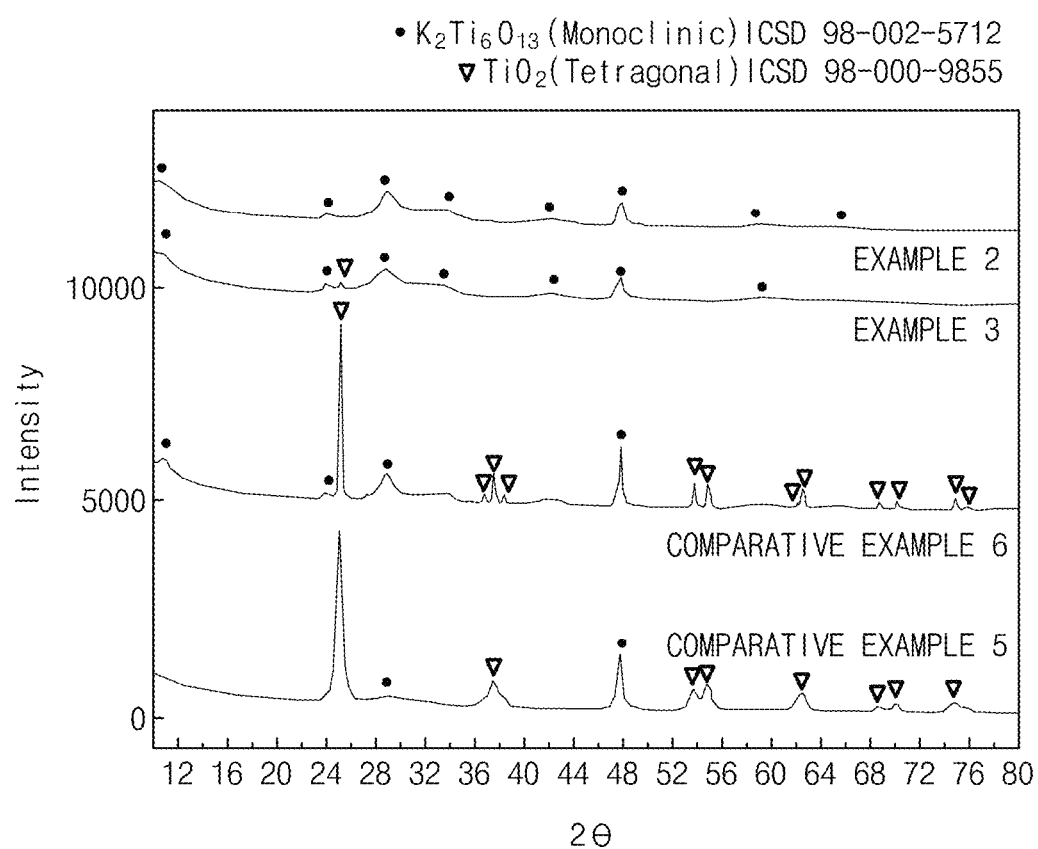
FIG. 12 is an X-ray diffraction analysis graph of the potassium titanate produced by Examples 2 and 3 and Comparative Examples 5 and 6 of the present invention.

As shown in FIG. 11, in Examples 2 and 3, potassium titanate whiskers of a uniform shape and size were produced, whereas in Comparative Examples 5 and 6, it was observed that potassium titanate whiskers having uneven shapes and sizes were produced. As shown in FIG. 12, in Comparative Examples 5 and 6, the presence of unreacted $TiO_2$ was found to indicate that the crystallization reaction was not completed.

<Comparison of Shape and Crystallinity of Potassium Titanate According to Reaction Molar Ratio>

In Examples 2 and 4, the titanium precursor and the potassium precursor were mixed at a molar ratio of 1:600 and 1:500, respectively to carry out the crystallization reaction, and in Example 5, was mixed at a molar ratio of 1:400 to perform a crystallization reaction and thus produced potassium titanate. The FE-SEM photographs thereof are shown in FIG. 13, and the XRD graph is shown in FIG. 14.

Figure 13:
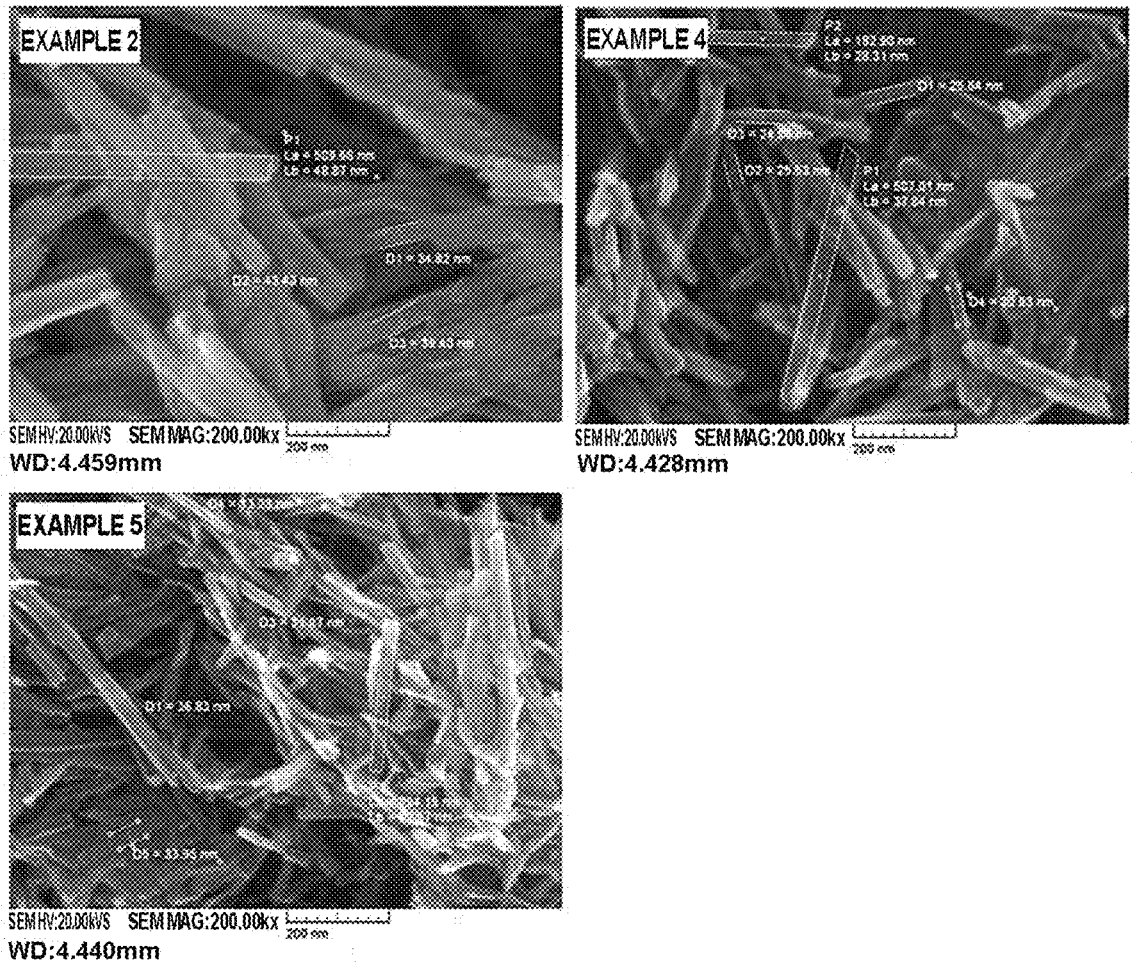
FIG. 13 is FE-SEM photographs (scale bar: 200 nm) of the potassium titanate produced by Examples 2, 4 and 5 of the present invention.
Figure 14:
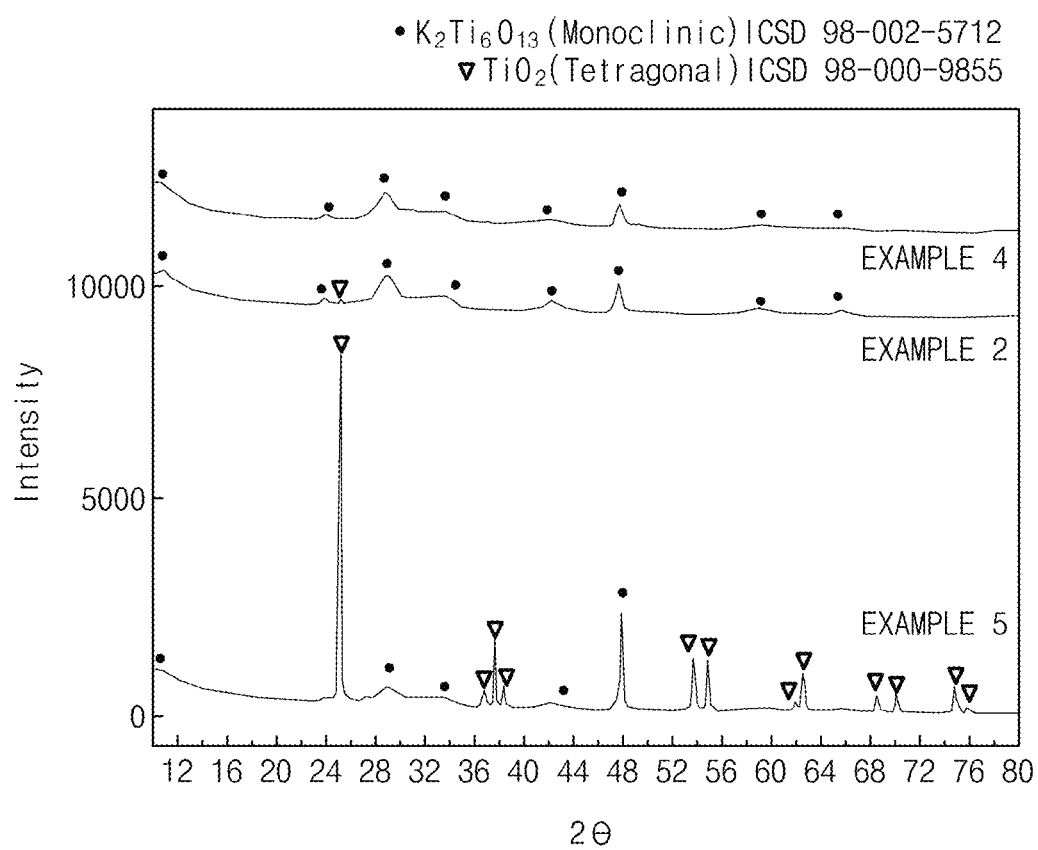
FIG. 14 is an X-ray diffraction analysis graph of the potassium titanate produced by Examples 2, 4 and 5 the present invention.

As shown in FIG. 13, in Examples 2 and 4, it was ascertained that potassium titanate whiskers having uniform shapes and sizes were produced, whereas in Example 5, in comparison with Comparative Example, the whisker shape is relatively clear and unreacted $TiO_2$ is small, but potassium titanate whiskers having uneven shapes and sizes were produced in comparison with Examples 2 and 4. As shown in FIG. 14, in Example 5, compared with Examples 2 and 4. As shown in FIG. 14, in the case of Example 5 compared to Examples 2 and 4, it was ascertained that the presence of the unreacted $TiO_2$ indicated that the crystallization reaction was not sufficiently performed as in Examples 2 and 4.

<Aspect Ratio Measurement of Potassium Titanate>

It was observed that according to the embodiment of the present invention, a uniform potassium titanate whisker having a specific aspect ratio was synthesized. On the contrary, in Comparative Examples 3, 4 and 6, the whisker shape was observed, but it was found that the specific aspect ratio of the present invention was not satisfied, and it was ascertained that the ratio of $TiO_2$ remaining by being unreacted was high and thus the crystallization reaction was not completed. On the other hand, in Comparative Example 5 in which the reaction time was 1 hour, the crystallization reaction time was so short that the shape of the whiskers could not be formed, and thus the aspect ratio could not be measured.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for producing potassium titanate, the method comprising the steps of:
   1) preparing a mixed solution including a titanium precursor and a potassium precursor; and
   2) heat-treating the mixed solution to synthesize potassium titanate,
   wherein the titanium precursor is anatase-phased titanium dioxide (a-$TiO_2$), wherein a molar ratio of the titanium precursor and the potassium precursor is 1:500 to 1:600, the heat treatment is performed at a heat treatment temperature of 200 to 300° C., and the heat treatment is performed for a heat treatment time of 3 hours or more.

2. The method of claim 1, wherein the heat treatment temperature is 210 to 240° C.

3. The method of claim 1, wherein the heat treatment time is 3 to 5 hours.

4. The method of claim 1, wherein Step 2) is maintained at a constant pressure during the heat treatment time.

5. The method of claim 1, further comprising steps of washing and drying the synthesized potassium titanate.

6. The method of claim 1, wherein the mixed solution comprises at least one solvent selected from the group consisting of: distilled water, hexane, ethanol and acetone.

7. The method of claim 1, wherein the potassium precursor is at least one selected from the group consisting of: potassium oxide, potassium carbonate, potassium hydroxide, and potassium oxalate.

8. The method of claim 1, wherein the potassium titanate is represented by $K_2O \cdot nTiO_2$, wherein n is an integer of 1 to 12.

9. The method of claim 1, wherein the potassium titanate is $K_2Ti_6O_{13}$.

10. The method of claim 1, wherein the potassium titanate has an aspect ratio of 10:1 to 15:1.

11. The method of claim 1, wherein the potassium titanate is in the form of a whisker.

12. A method for producing potassium titanate, the method comprising the steps of:
   1) preparing a mixed solution including a titanium precursor and a potassium precursor; and
   2) heat-treating the mixed solution to synthesize potassium titanate, wherein the titanium precursor is anatase-phased titanium dioxide (a-$TiO_2$), wherein the potassium titanate has a length of 100 to 600 nm, the heat treatment is performed at a heat treatment temperature of 200 to 300° C., and the heat treatment is performed for a heat treatment time of 3 hours or more.

* * * * *